(12) United States Patent
Bian et al.

(10) Patent No.: US 10,996,398 B1
(45) Date of Patent: May 4, 2021

(54) SWITCHABLE POLARIZATION SPLITTERS

(71) Applicant: GLOBALFOUNDRIES U.S. Inc., Santa Clara, CA (US)

(72) Inventors: Yusheng Bian, Ballston Lake, NY (US); Ajey Poovannummoottil Jacob, Watervliet, NY (US)

(73) Assignee: GLOBALFOUNDRIES U.S. INC., Santa Clara, CA (US)

( * ) Notice: Subject to any disclaimer, the term of this patent is extended or adjusted under 35 U.S.C. 154(b) by 0 days.

(21) Appl. No.: 16/703,356

(22) Filed: Dec. 4, 2019

(51) Int. Cl.
| | |
|---|---|
| *G02B 6/27* | (2006.01) |
| *G02B 6/12* | (2006.01) |
| G02B 27/28 | (2006.01) |
| G02F 1/313 | (2006.01) |

(52) U.S. Cl.
CPC ............. *G02B 6/2773* (2013.01); *G02B 6/12* (2013.01); *G02B 6/272* (2013.01); *G02B 6/274* (2013.01); *G02B 27/283* (2013.01); *G02B 2006/12116* (2013.01); *G02F 1/3136* (2013.01)

(58) Field of Classification Search
CPC ........ G02B 6/2773; G02B 6/274; G02B 6/12; G02B 6/272; G02B 2006/12116
See application file for complete search history.

(56) References Cited

U.S. PATENT DOCUMENTS

| | | | | |
|---|---|---|---|---|
| 5,740,288 | A | 4/1998 | Pan | |
| 8,923,665 | B2 * | 12/2014 | Barwicz | G02B 6/126 385/14 |
| 9,002,144 | B2 * | 4/2015 | Fujikata | G02F 1/025 385/3 |
| 9,529,151 | B2 * | 12/2016 | Goi | G02B 6/14 |
| 9,557,482 | B2 * | 1/2017 | Oka | G02B 6/126 |
| 9,645,312 | B2 * | 5/2017 | Barwicz | G02B 27/283 |
| 9,971,071 | B2 * | 5/2018 | Caldwell | G01J 5/0896 |
| 9,977,187 | B2 * | 5/2018 | Shi | G02B 6/126 |
| 10,036,851 | B1 * | 7/2018 | Peng | G11B 5/6088 |
| 10,241,273 | B2 * | 3/2019 | Tu | G02B 6/2766 |
| 10,367,598 | B2 * | 7/2019 | Testa | H04B 10/25 |
| 10,429,581 | B1 * | 10/2019 | Thomas | G02B 6/12007 |
| 10,488,590 | B2 * | 11/2019 | Park | G02B 6/2766 |
| 10,641,956 | B1 * | 5/2020 | Bian | G02B 6/125 |
| 10,677,987 | B1 * | 6/2020 | Dumais | G02B 6/276 |
| 2019/0302361 | A1 * | 10/2019 | Oh | G02B 6/122 |

OTHER PUBLICATIONS

Yusheng Bian et al., "Tunable Grating Couplers", filed Jul. 19, 2019 as U.S. Appl. No. 16/516,658.
Yusheng Bian et al., "Switchable and Reconfigurable Grating Couplers" filed Nov. 26, 2018 as U.S. Appl. No. 16/199,811.

(Continued)

*Primary Examiner* — Ryan A Lepisto
(74) *Attorney, Agent, or Firm* — Thompson Hine LLP; Francois Pagette

(57) ABSTRACT

Structures for a polarization splitter and methods of fabricating a structure for a polarization splitter. First and second waveguide cores of the polarization splitter are located adjacent to each other in a coupling region. A third waveguide core is located over the second waveguide core in the coupling region. The third waveguide core is composed of a material having a variable refractive index.

20 Claims, 9 Drawing Sheets

(56) References Cited

OTHER PUBLICATIONS

J. Wang et al., "A Tunable Polarization Beam Splitter Based on Magnetic Fluids-Filled Dual-Core Photonic Crystal Fiber," in IEEE Photonics Journal, vol. 9, No. 1, pp. 1-10, Feb. 2017, Art No. 2200410.

Zhu et al., "Tunable polarization beam splitter based on optofluidic ring resonator", Optics Express vol. 24, Issue 15, pp. 17511-17521 (2016).

Arash Joushaghani et al., "Sub-volt broadband hybrid plasmonic-vanadium dioxide switches" Appl. Phys. Lett. 102, 061101 (2013); https://doi.org/10.1063/1.4790834.

Li et al., "Optical absorption in graphene integrated on silicon waveguides", Appl. Phys. Lett. 101, 111110 (2012); https://doi.org/10.1063/1.4752435.

Ooi et al., "All-optical control on a graphene-on-silicon waveguide modulator", Scientific Reports vol. 7, Article No. 12748 (2017).

Rafael E. P. de Oliveira et al., "Graphene Based Waveguide Polarizers: In-Depth Physical Analysis and Relevant Parameters", Scientific Reports vol. 5, Article No. 16949 (2015).

Kim et al., "Graphene-based polymer waveguide polarizer", © 2012 Optical Society of America.

Briggs et al., "Compact silicon photonic waveguide modulator based on the vanadium dioxide metal-insulator phase transition", © 2010 Optical Society of America.

Earl et al., "Tunable optical antennas enabled by the phase transition in vanadium dioxide", © 2013 Optical Society of America.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611.

Yusheng Bian et al., "Polarizers and Polarization Splitters Phase-Matched With a Back-End-of-Line Layer" filed Mar. 4, 2019 as U.S. Appl. No. 16/291,346.

\* cited by examiner

SWITCHABLE POLARIZATION SPLITTERS

BACKGROUND

The present invention relates to photonics chips and, more specifically, to structures for a polarization splitter and methods of fabricating a structure for a polarization splitter.

Photonics chips are used in many applications and systems including, but not limited to, data communication systems and data computation systems. A photonics chip integrates optical components, such as waveguides, optical switches, and bends, and electronic components, such as field-effect transistors, into a unified platform. Among other factors, layout area, cost, and operational overhead may be reduced by the integration of both types of components.

Polarization splitter splitters are a type of optical component commonly found in photonics chips. A polarization splitter divides optical signals received at a single port into orthogonal linear polarizations (e.g., a transverse electric mode component and a transverse magnetic mode component) that are output through a pair of ports for individual processing in by subsequent optical components. Conventional polarization splitters are passive optical components having an optical performance that cannot be tuned, switched, or configured.

Improved structures for a polarization splitter and methods of fabricating a structure for a polarization splitter are needed.

SUMMARY

In an embodiment of the invention, a structure for a polarization splitter is provided. The structure includes a first waveguide core, a second waveguide core adjacent to the first waveguide core in a coupling region, and a third waveguide core over the second waveguide core in the coupling region. The third waveguide core is composed of a material having a variable refractive index.

In an embodiment of the invention, a method of forming a structure for a polarization splitter is provided. The method includes forming a first waveguide core and a second waveguide core that is adjacent to the first waveguide core in a coupling region. The method further includes forming a third waveguide core over the second waveguide core in the coupling region. The third waveguide core is composed of a material having a variable refractive index.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
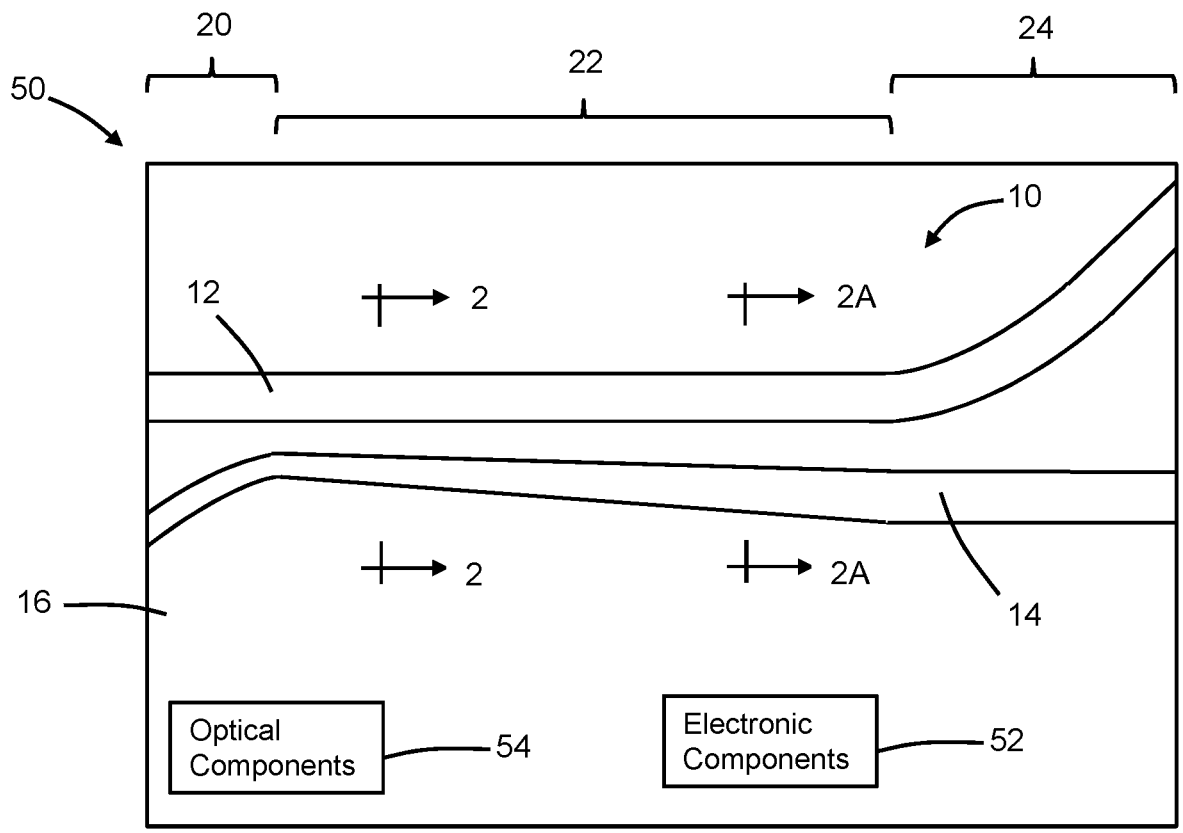
FIG. 1 is a diagrammatic top view of a structure at an initial fabrication stage of a processing method in accordance with embodiments of the invention.
Figure 2:
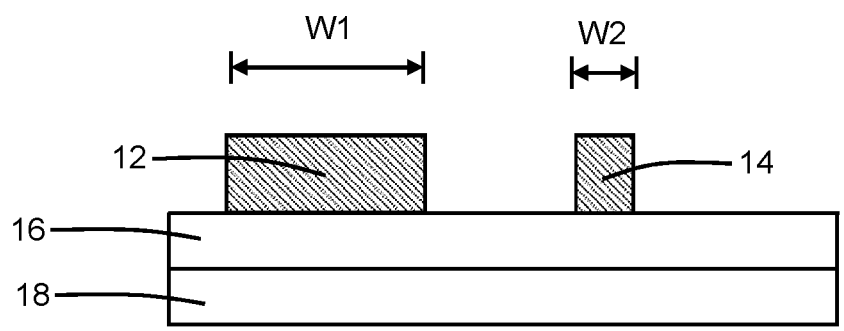
FIG. 2 is a cross-sectional view of the structure taken generally along line 2-2 in FIG. 1.
Figure 2A:
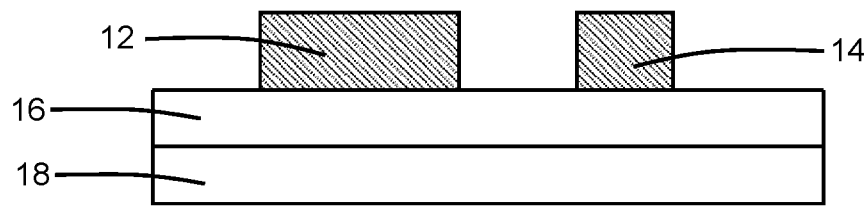
FIG. 2A is a cross-sectional view of the structure taken generally along line 2A-2A in FIG. 1.

With reference to FIGS. 1, 2, 2A and in accordance with embodiments of the invention, a structure 10 for a switchable polarization splitter includes a waveguide core 12 and a waveguide core 14 that are positioned over a dielectric layer 16. The waveguide core 12 and the waveguide core 14 may be composed of a single-crystal semiconductor material, such as single-crystal silicon from a device layer of a silicon-on-insulator (SOI) wafer. The silicon-on-insulator wafer further includes a buried insulator layer composed of a dielectric material, such as silicon dioxide, that provides the dielectric layer 16 and a substrate 18 composed of a single-crystal semiconductor material, such as single-crystal silicon, under the buried insulator layer. The waveguide core 12 and the waveguide core 14 may be patterned from the device layer of the silicon-on-insulator wafer by lithography and etching processes during front-end-of-line processing. The device layer of the silicon-on-insulator wafer may be fully etched to define a rib waveguide as shown or, alternatively, only partially etched to define a ridge waveguide. The waveguide core 12 and the waveguide core 14, which may be concurrently formed from the same layer of material, may have coplanar or substantially coplanar top and bottom surfaces.

The waveguide cores 12, 14 may be arranged in an input region 20, a coupling region 22, and an output region 24. The waveguide core 12 may have a width, W1, that is constant or substantially constant over its length in at least the coupling region 20. The waveguide core 14 may have a width, W2, that is tapered over its length in the coupling region 22. The waveguide core 14 widens within the coupling region 22 with increasing distance from the input region 20. The input region 20 of the waveguide core 14 may include a bend that brings the waveguide cores 12, 14 into proximity for evanescent coupling, and the output region 24 of the waveguide core 12 may include a bend that removes the waveguide cores 12, 14 from proximity to prevent evanescent coupling.

Optical signals propagating with both transverse magnetic (TM) and transverse electric (TE) mode components may be guided on the photonics chip by the waveguide core 12 to the input region 20. One mode component, such as the TM mode component, of the light embodied in the optical signals may be coupled from the waveguide core 12 to the waveguide core 14 in the coupling region 22 of the structure 10 due to phase matching and may be further guided on the photonics chip 50 to a downstream destination by the waveguide core 14. The other mode component, such as the TE mode component, of the light embodied in the optical signals passes through the coupling region 22 of the structure 10 with a low loss to be further guided on the photonics chip 50 to a downstream destination by the waveguide core 12.

Figure 3:
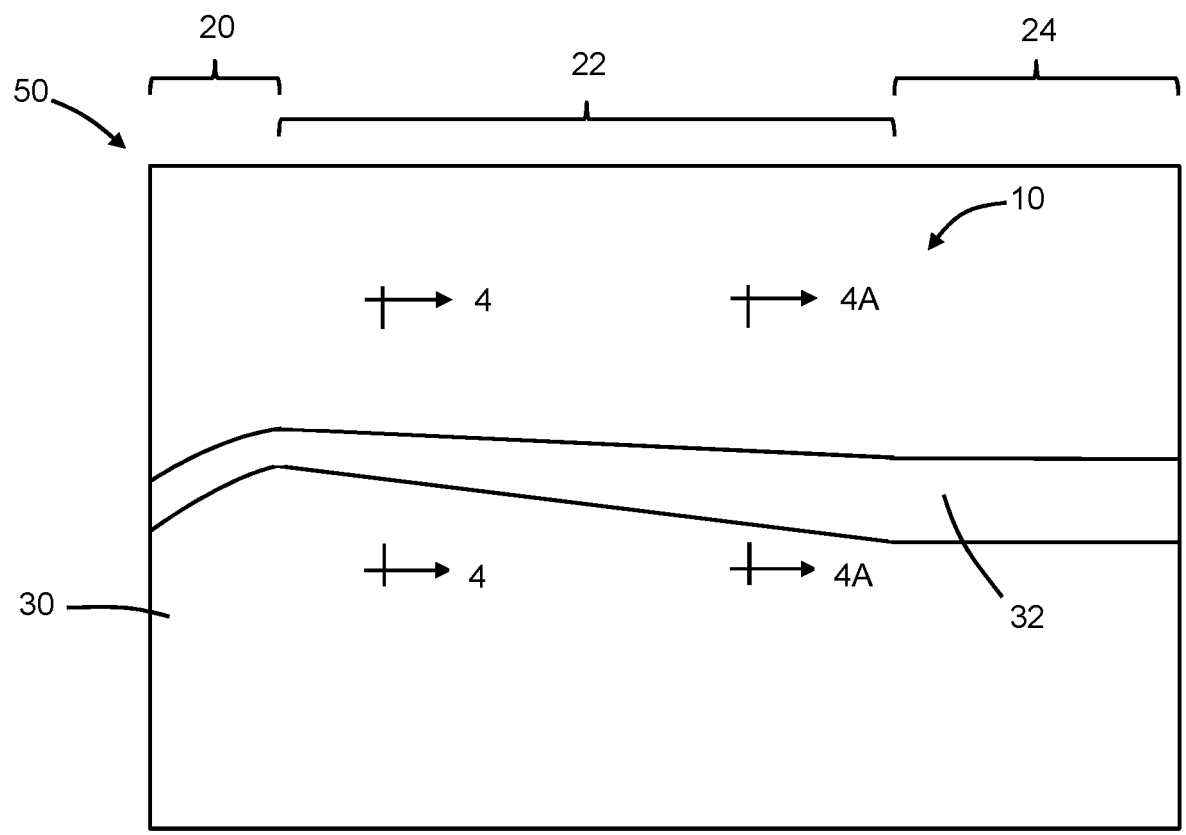
FIG. 3 is a top view of the structure at a fabrication stage subsequent to FIG. 1.
Figure 4:
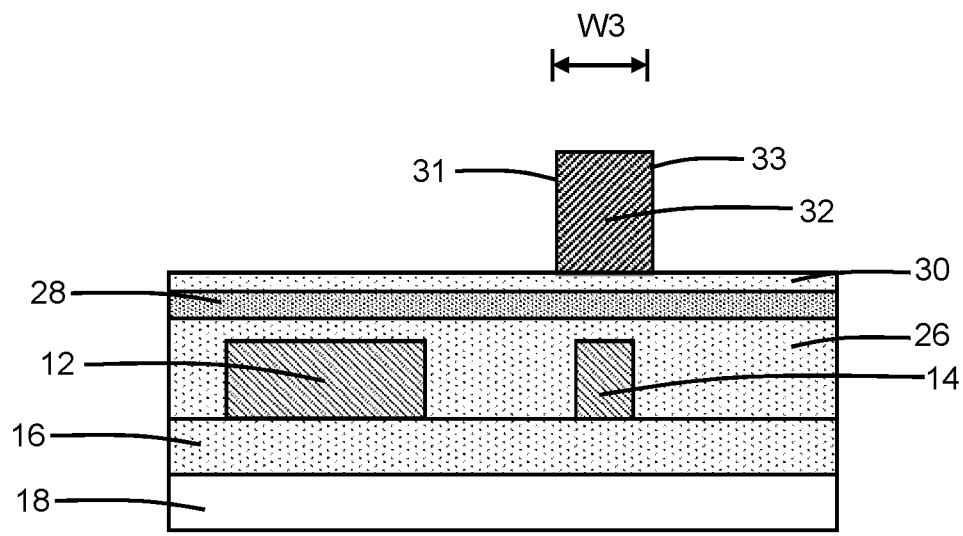
FIG. 4 is a cross-sectional view of the structure taken generally along line 4-4 in FIG. 3.
Figure 4A:
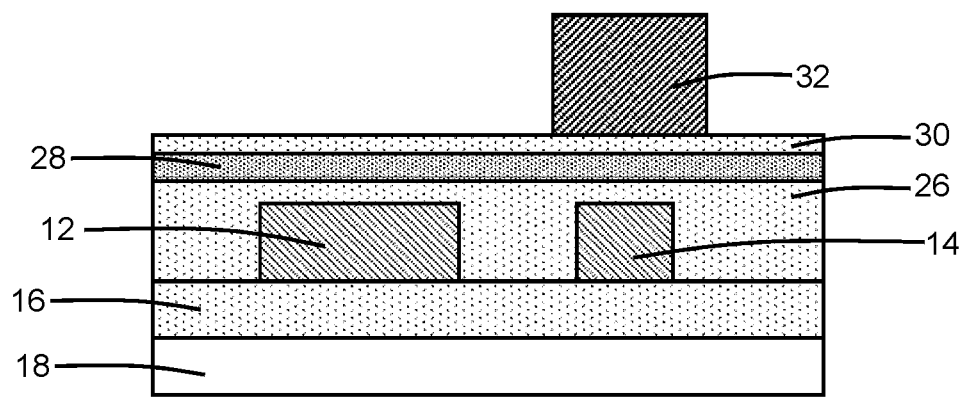
FIG. 4A is a cross-sectional view of the structure taken generally along line 4A-4A in FIG. 3.

With reference to FIGS. 3, 4, 4A in which like reference numerals refer to like features in FIGS. 1, 2, 2A and at a subsequent fabrication stage of the processing method, dielectric layers 26, 28, 30 composed of respective dielectric materials are sequentially formed over the waveguide core 12 and waveguide core 14. The waveguide core 12 and waveguide core 14 are embedded or buried in the dielectric material of the dielectric layer 26. The dielectric layer 28 is positioned over the dielectric layer 26, and the dielectric layer 30 is positioned over the dielectric layer 28. The dielectric layer 26 may be composed of a dielectric material, such as silicon dioxide, deposited by chemical vapor deposition and planarized with, for example, chemical mechanical polishing to remove topography. The dielectric layer 28, which is optional, may be composed of dielectric material, such as silicon dioxide, deposited by chemical vapor deposition or atomic layer deposition over the dielectric layer 26. The dielectric layer 30 may be composed of dielectric material, such as silicon nitride, deposited by chemical vapor deposition or atomic layer deposition over the dielectric layer 28.

A waveguide core 32 containing an active material may be deposited on the dielectric layer 30 by atomic layer deposition or chemical vapor deposition and patterned with lithography and etching processes. In an embodiment, the waveguide core 32 may be composed of an active material, such as a conductor, with a variable index of refraction (i.e., refractive index) that can be varied as a function of an electric field from a selectively applied bias voltage to transition between discrete states characterized by different refractive indices. In an embodiment, the waveguide core 32 may be composed of an active material, such as a conductor, with a variable index of refraction (i.e., refractive index) that can be varied as a function of temperature from selectively applied heat to transition between discrete states characterized by different refractive indices. In an embodiment, the waveguide core 32 may be composed of a conducting oxide, such as indium-tin oxide (ITO). In an embodiment, the waveguide core 32 may be composed of a phase change material, such as vanadium oxide or germanium-antimony telluride. In an embodiment, the waveguide core 32 may be composed of a two-dimensional material, such as graphene or molybdenum disulphide. In an embodiment, the waveguide core 32 may be composed of a polymer.

The waveguide core 32 may be positioned over the waveguide core 14 with an overlapping arrangement from a perspective in a vertical direction, and the waveguide core 32 may have the same or substantially the same shape as the waveguide core 14 in the input region 20, coupling region 22, and output region 24 of the structure 10 such that the waveguide cores 14, 32 are stacked. For example, the waveguide core 32 may have a taper equal or substantially equal to the taper of the waveguide core 14 in the coupling region 22 of the structure 10 and a bend equal or substantially equal to the bend of the waveguide core 14 in the input region 20 of the structure 10. In an embodiment, the waveguide core 32 may have a width, W3, that is tapered over its length in the coupling region 22 and that is greater the width of the waveguide core 14 at any location along the length of the waveguide core 14 in the coupling region 22.

The waveguide core 32 is positioned in a different plane than the waveguide cores 12, 14 and, in particular, the waveguide cores 12, 14 are positioned in a vertical direction between the waveguide core 32 and the dielectric layer 16. The waveguide core 32 includes opposite sidewalls 31, 33 and the waveguide core 14 may be laterally arranged between the opposite sidewalls 31, 33 albeit in a different plane.

Figure 5:
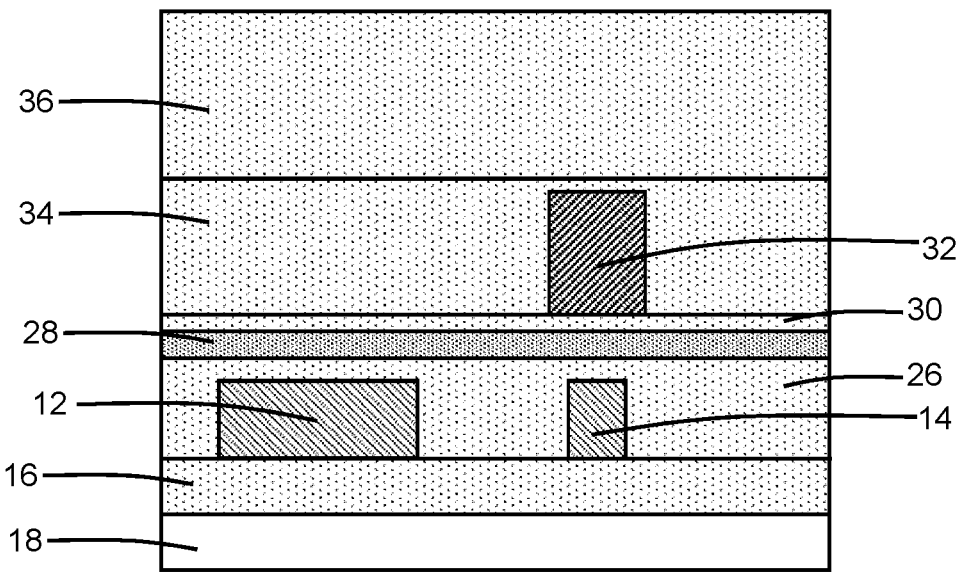
FIGS. 5 and 5A are cross-sectional views of the structure at a fabrication stage subsequent to FIGS. 4, 4A.
Figure 5A:
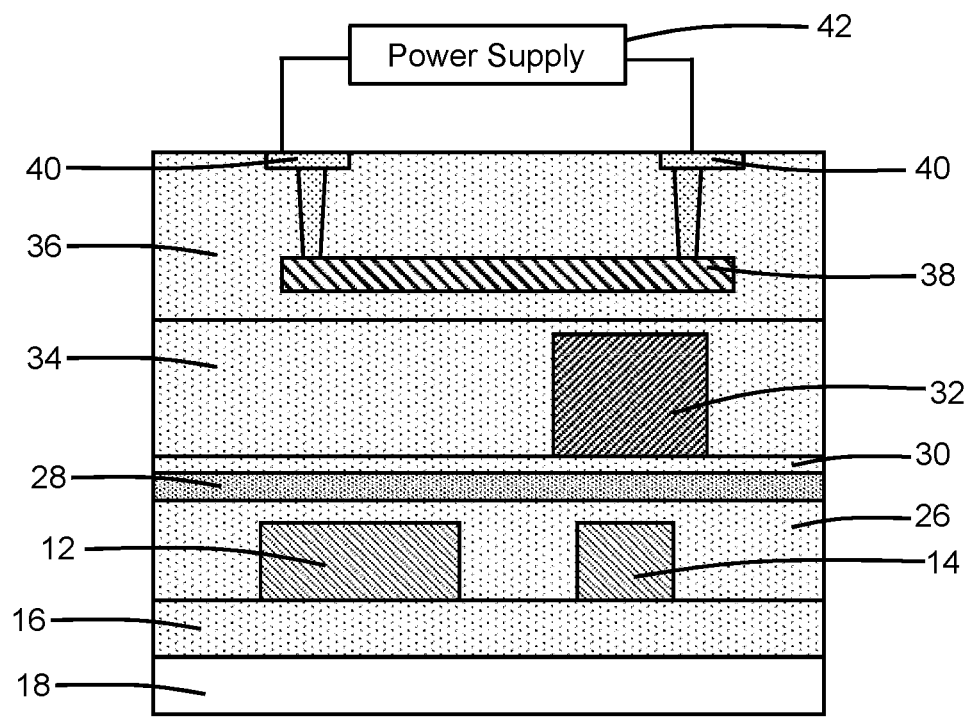

With reference to FIG. 5 in which like reference numerals refer to like features in FIG. 4 and at a subsequent fabrication stage of the processing method, a dielectric layer 34 may be formed over the dielectric layer 28 and the waveguide core 32. The dielectric layer 34 may be composed of dielectric material, such as silicon dioxide, deposited by chemical vapor deposition or atomic layer deposition. In an embodiment, the dielectric layer 34 may be composed of a dielectric material, such as silicon dioxide, deposited by chemical vapor deposition using ozone and tetraethylorthosilicate (TEOS) as reactants.

A back-end-of-line stack 36 may be formed by back-end-of-line processing over the dielectric layer 34. The back-end-of-line stack 36 may include one or more dielectric layers composed of a dielectric material, such as silicon dioxide or a low-k dielectric material, and metal features composed of a metal, such as copper or cobalt, that are arranged in the one or more dielectric layers.

The waveguide core 32 can be placed in different states in which the variable refractive index of its material is tunable (i.e., switchable) to provide transitions between the different states. The state-to-state transition can be initiated by an external stimulus, such as heating, an electric field supplied by an applied bias voltage, an electrical current supplied by an applied bias voltage, or optical absorption by, for example, optical pumping.

In an embodiment, a heater 38 may be disposed in the back-end-of-line stack 36 in proximity to the waveguide core 32. The heater 38 is coupled by metal features 40 in the back-end-of-line stack 36 with a power supply 42 for powering the heater 38 to provide a temperature change prompting the refractive index change of the material of the waveguide core 32. During operation, heat is transferred from the powered heater 38 through the dielectric material of the back-end-of-line stack 36 to the waveguide core 32 in the coupling region 22 of the structure 10. The temperature of the waveguide core 32 in the coupling region 22 of the structure 10 may be varied by the selective application of heat to provide a state with a low index of refraction below a transition temperature and a state with a high index of refraction above the transition temperature. For example, the real part of the refractive index of the active material may be higher when the temperature is above the transition temperature than when the temperature is below the transition temperature.

Figure 6:
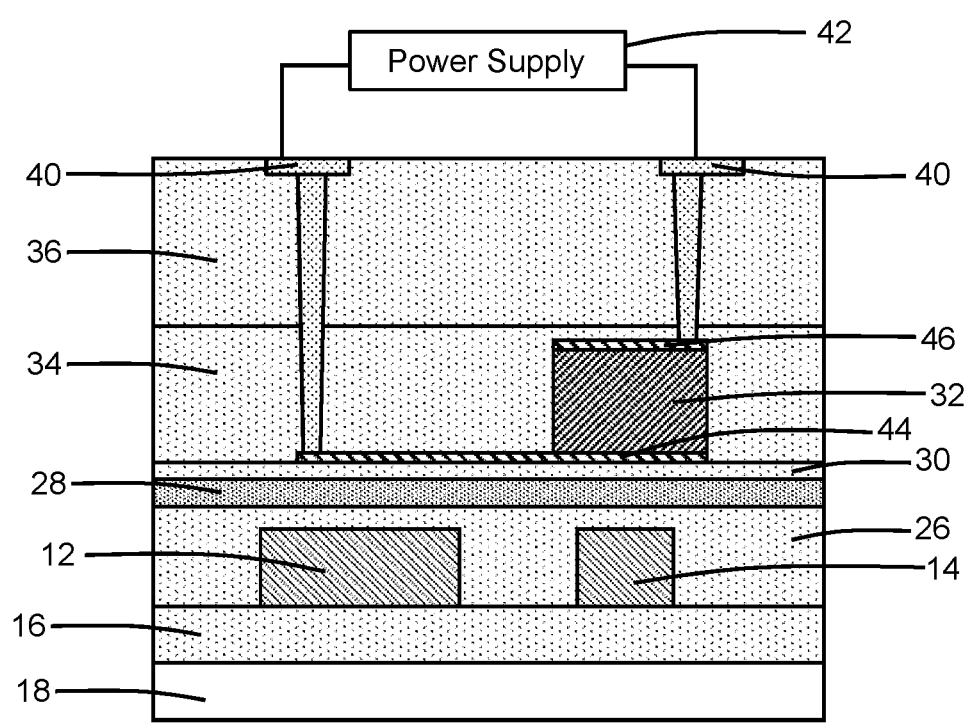
FIG. 6 is a cross-sectional view of a structure in accordance with alternative embodiments of the invention.

In an alternative embodiment and as shown in FIG. 6, the waveguide core 32 may include upper and lower electrodes in the form of conductive layers 44, 46. The conductive layers 44, 46 are coupled by the metal features 40 in the back-end-of-line stack 36 with the power supply 42 for supplying a bias voltage to prompt a refractive index change of the waveguide core 32. Through these connections, a switchable bias voltage may be selectively applied from the power supply 42 to the upper and lower conductive layers 44, 46 for providing an electric field to produce with the high and low refractive index states for the active material of the waveguide core 32. For example, the real part of the refractive index of the active material may be higher when the electric field is present than when the electric field is absent.

The structure 10 is tunable because the material properties of the waveguide core 32 provide a refractive index that can be varied by, for example, the application of a bias voltage or by the application of heat. In embodiments, the refractive index of the active material of the waveguide core 32 can be varied with biasing or with heating to effectively switch the structure 10 between different states for light coupling. In one state (e.g., no applied bias voltage or a temperature less than the transition temperature), the active material of the waveguide core 32 has a low refractive index and one mode component (e.g., the TM mode) of the optical signals may be coupled from the waveguide core 12 to the waveguide core 14 in the coupling region 22 of the structure 10 due to phase matching. One of the mode components (e.g., the TM mode) of the optical signals exits the output region 24 of the structure 10 guided by the waveguide core 12, and the other of the mode components (e.g., the TM mode) of the optical signals exits the output region 24 of the structure 10 guided by the waveguide core 14. In another state (e.g., an applied bias voltage or a temperature greater than the transition temperature), the active material of the waveguide core 32 may have a high refractive index and may prevent the coupling of optical signals from the waveguide core 12 to the waveguide core 14 in the coupling region 22 of the structure 10 because the phase match is broken. In this state, both mode components of the optical signals exit the output region 24 of the structure 10 guided by the waveguide core 12. The state-to-state transition is reversible by removing the electric field by switching off the applied bias voltage or lowering the temperature by regulating the supplied power.

The structure 10, in any of its embodiments described herein, may be integrated into a photonics chip 50 (FIG. 1) that includes electronic components 52 and optical components 54. For example, the photonics chip 50 may integrate one or more photodetectors representing optical components 54 that receive optical signals carried by the structure 10 and convert those optical signals into electrical signals that may be processed by the electronic components 52. The electronic components 52 may include field-effect transistors that are fabricated by CMOS front-end-of-line processes using the device layer of the SOI wafer.

Figure 7:
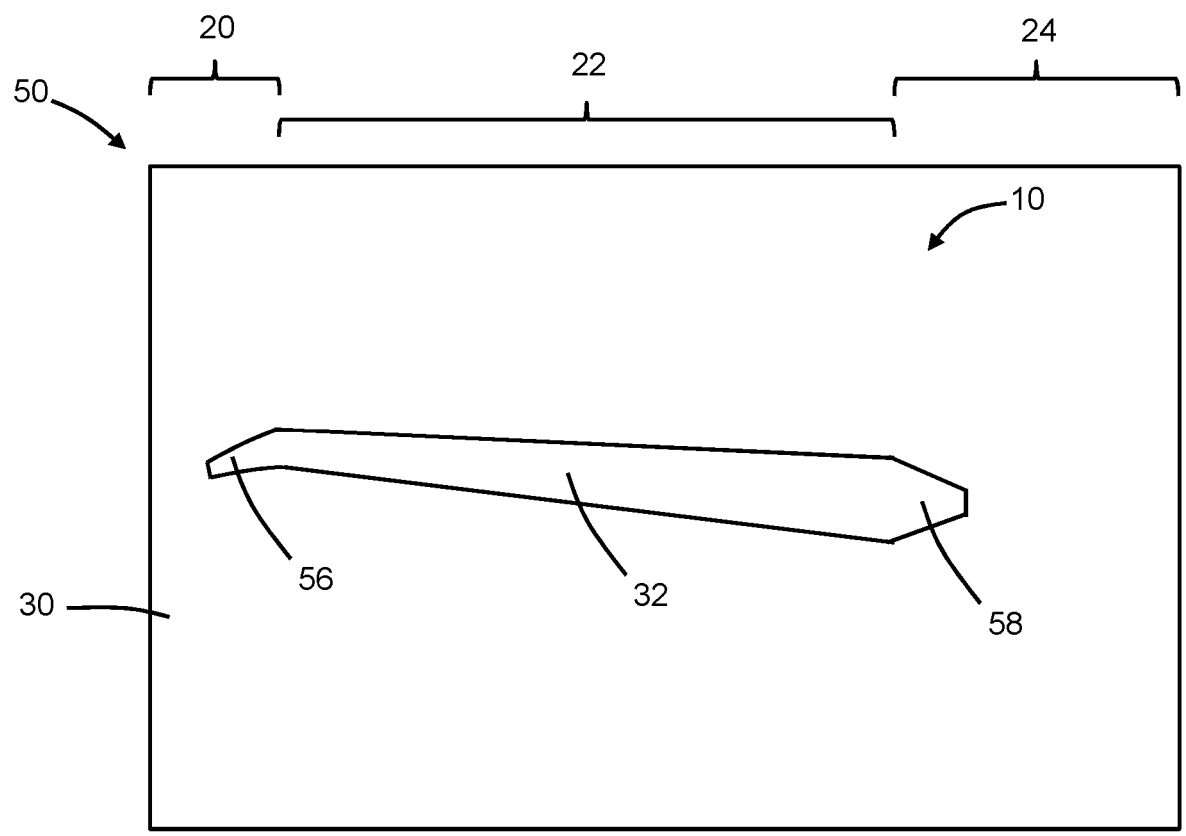
FIG. 7 is a top view of a structure in accordance with alternative embodiments of the invention.

With reference to FIG. 7 in which like reference numerals refer to like features in FIG. 3 and in accordance with alternative embodiments of the invention, the waveguide core 32 may be located primarily in the coupling region 22 of the structure 10, and may terminate in the input and output regions 20, 24. The waveguide core 32 may include terminating tapers 56, 58 at opposite ends of the tapered portion in the coupling region 22. The taper 56 may extend into the input region 20 and may terminate the waveguide core 32 in the input region 20. The taper 58 may extend into the output region 24 and may terminate the waveguide core 32 in the output region 24.

Figure 8:
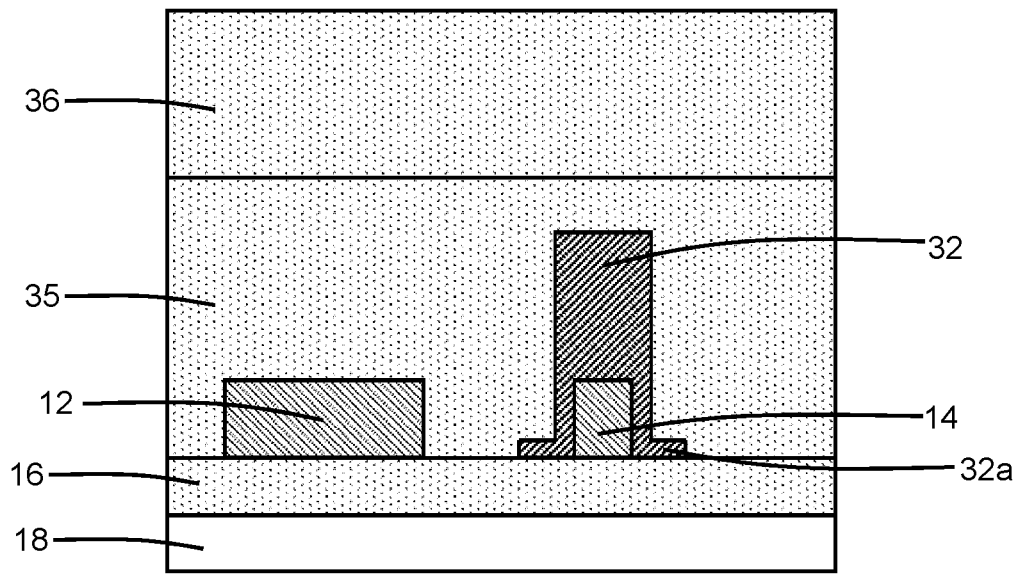
FIGS. 8, 8A are cross-sectional views of a structure in accordance with alternative embodiments of the invention.
Figure 8A:
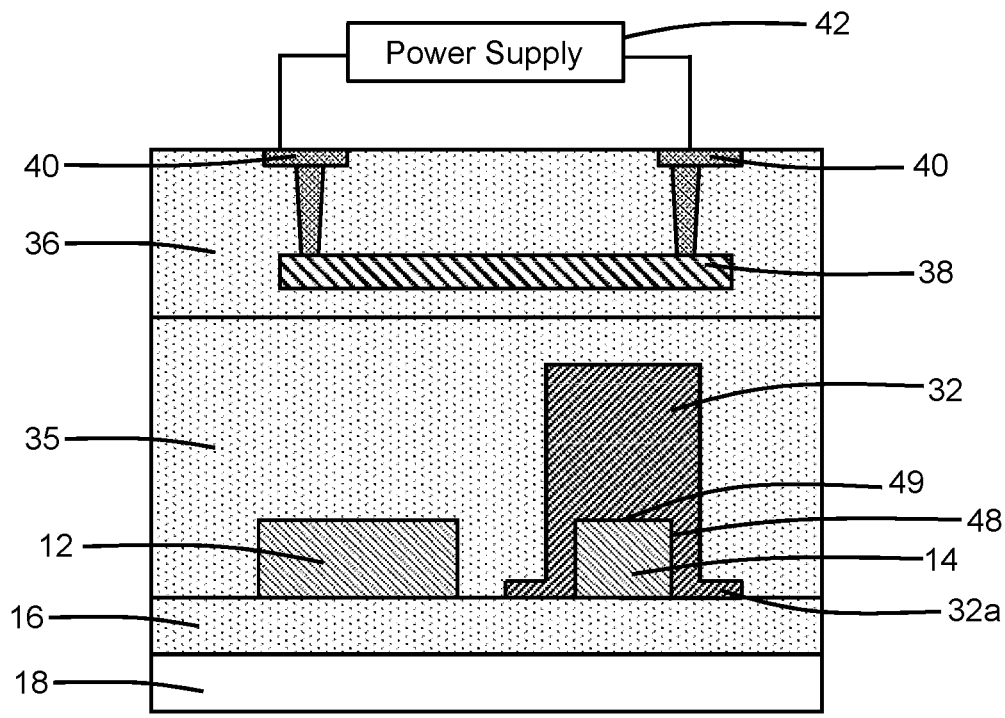

With reference to FIGS. 8, 8A in which like reference numerals refer to like features in FIGS. 4, 4A and in accordance with alternative embodiments of the invention, the waveguide core 32 may be formed such that the waveguide core 32 wraps about the side surfaces 48 and top surface 49 of the waveguide core 14 and extends in a vertical direction to the dielectric layer 16. In the representative embodiment, the waveguide core 32 may include feet 32a that extend outwardly from the side surfaces of a central section. Alternatively, the feet 32a may be omitted from the waveguide core 32. In the representative embodiment, the waveguide core 32 directly contacts the side surfaces 48 and top surface 49 of the waveguide core 14, as well as directly contacts the dielectric layer 16 adjacent to the waveguide core 14. The waveguide core 32 may be formed by depositing a layer of its active material over the waveguide cores 12, 14 and patterning the layer with lithography and etching processes. The width of the waveguide core 32 tapers with the tapering of the waveguide core 14 in the coupling region 22 such that the surfaces 48, 49 are covered over the entire coupling region 22.

The waveguide core 12, waveguide core 14, and waveguide core 32 may be embedded or buried in the dielectric material of a dielectric layer 35. The dielectric layer 35 may be composed of a dielectric material, such as silicon dioxide, deposited by chemical vapor deposition and planarized with, for example, chemical mechanical polishing to remove topography. The back-end-of-line stack 36 may be formed over the dielectric layer 35.

Figure 9:
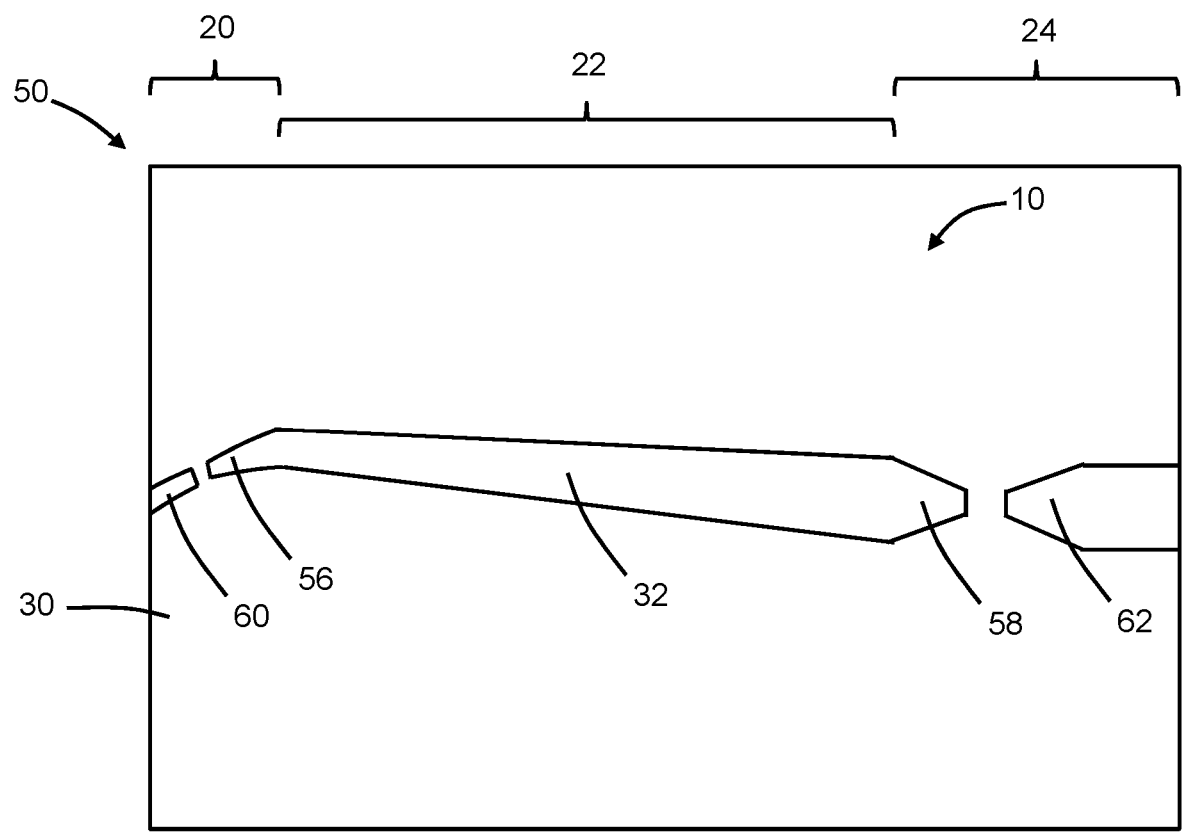
FIG. 9 is a top view of a structure in accordance with alternative embodiments of the invention.

With reference to FIG. 9 in which like reference numerals refer to like features in FIG. 3 and in accordance with alternative embodiments of the invention, a waveguide core 60 may be located over the waveguide core 14 in the input region 20, and a waveguide core 62 may be located over the waveguide core 14 in the output region 24. The waveguide cores 60, 62 may be arranged in the same plane as the waveguide core 32, and may composed of a dielectric material, such as silicon nitride. In an embodiment, the waveguide core 60 may be located with an overlapping arrangement from a perspective in a vertical direction over the waveguide core 14 in the input region 20, and the waveguide core 62 may be located with an overlapping arrangement from a perspective in a vertical direction over the waveguide core 14 in the output region 24. The waveguide cores 60, 62 may function to reduce insertion loss and/or crosstalk.

Figure 10:
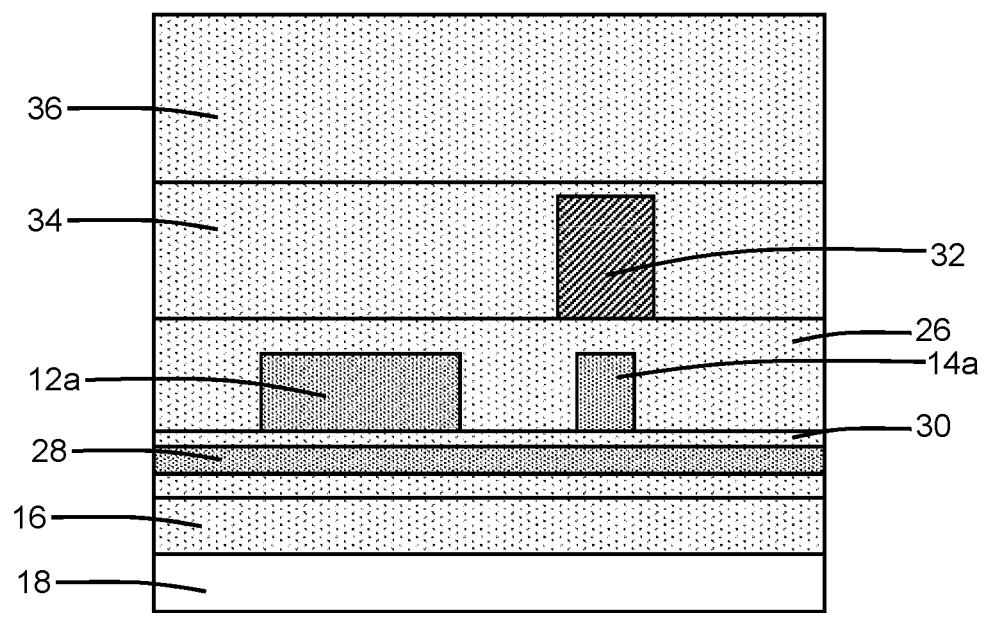
FIGS. 10, 10A are cross-sectional views of a structure in accordance with alternative embodiments of the invention.
Figure 10A:
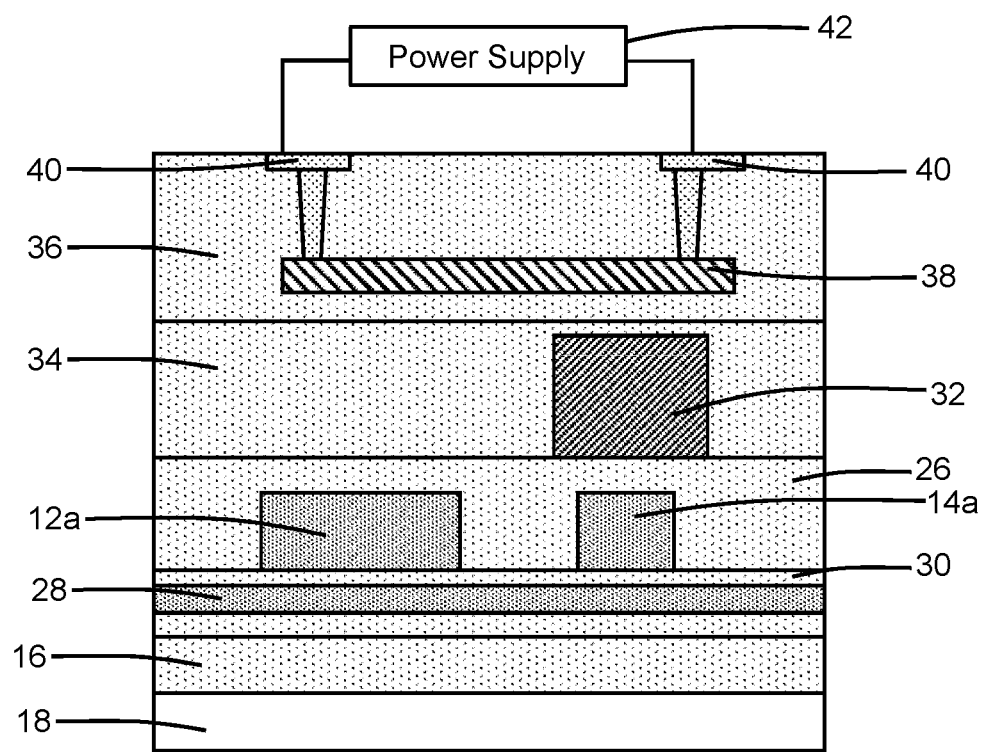

With reference to FIGS. 10, 10A in which like reference numerals refer to like features in FIGS. 4, 4A and in accordance with alternative embodiments of the invention, the waveguide cores 12, 14 may be replaced by waveguide cores 12a, 14a that are composed of a different material. In an embodiment, the waveguide cores 12a, 14a may be composed of silicon nitride. The waveguide core 32 is positioned over the waveguide cores 12a, 14a as described in connection with the spatial relationship between the waveguide core 32 and the waveguide cores 12, 14. The waveguide core 32 may be embodied as shown in FIG. 2, FIG. 7, or FIGS. 8, 8A.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a polarization splitter, the structure comprising:
   a first waveguide core;
   a second waveguide core adjacent to the first waveguide core in a coupling region, the second waveguide core having a first bend in an input region adjacent to the coupling region, the second waveguide core having a second bend in an output region adjacent to the coupling region, and the second waveguide core tapered with a width that increases within the coupling region with increasing distance from the input region; and
   a third waveguide core over the second waveguide core in the coupling region, the third waveguide core having a bend in the input region that is positioned over the first bend of the second waveguide core, and the third waveguide core tapered with a width that is greater than the width of the second waveguide core within the coupling region,
   wherein the third waveguide core is comprised of an active material having a variable refractive index.

2. The structure of claim 1 further comprising:
   a power supply; and
   a heater coupled to the power supply, the heater positioned in proximity to the third waveguide core, the heater configured to selectively transfer heat to the third waveguide core for varying the variable refractive index of the active material of the third waveguide core.

3. The structure of claim 1 further comprising:
   a power supply;
   a first electrode coupled to the power supply; and
   a second electrode coupled to the power supply,
   wherein the third waveguide core is positioned between the first electrode and the second electrode, and the power supply configured to selectively provide a bias voltage applied to the first electrode and the second electrode for varying the variable refractive index of the active material of the third waveguide core.

4. The structure of claim 1 wherein the variable refractive index of the active material is configured to be varied by a selectively applied electric field between a first refractive index and a second refractive index that is greater than the first refractive index.

5. The structure of claim 1 wherein the active material is a conducting oxide.

6. The structure of claim 1 wherein the active material is a phase change material.

7. The structure of claim 1 wherein the active material is a two-dimensional material or a polymer.

8. The structure of claim 1 wherein the second waveguide core includes a plurality of surfaces, and the third waveguide core is wrapped about the plurality of surfaces of the second waveguide core.

9. The structure of claim 8 wherein the third waveguide core is in direct contact with the second waveguide core.

10. The structure of claim 1 wherein the first waveguide core and the second waveguide core are each comprised of single-crystal silicon.

11. The structure of claim 1 wherein the first waveguide core and the second waveguide core are each comprised of silicon nitride.

12. The structure of claim 1 wherein the first waveguide core and the second waveguide core are located in a first plane, the third waveguide core is located in a second plane displaced in a vertical direction from the first plane, the third waveguide core includes a first sidewall and a second sidewall, and the second waveguide core is laterally positioned between the first sidewall and the second sidewall of the third waveguide core to provide an overlapping arrangement.

13. The structure of claim 1 wherein the first waveguide core, the second waveguide core, and the third waveguide core are located on a photonics chip.

14. A structure for a polarization splitter, the structure comprising:
    a first waveguide core;
    a second waveguide core adjacent to the first waveguide core in a coupling region; and
    a third waveguide core over the second waveguide core in the coupling region,
    wherein the third waveguide core is comprised of an active material having a variable refractive index, and the variable refractive index of the active material is configured to be varied by selective temperature change between a first refractive index and a second refractive index that is greater than the first refractive index.

15. The structure of claim 14 wherein the third waveguide core includes a first taper and a second taper, the first taper terminates the third waveguide core at a first end, and the second taper terminates the third waveguide core at a second end opposite to the first end.

16. The structure of claim 14 wherein the third waveguide core is positioned with an overlapping arrangement from a perspective in a vertical direction over the second waveguide core, and the third waveguide core is wider than the second waveguide core.

17. The structure of claim 14 wherein the second waveguide core has a first tapered width in the coupling region, the third waveguide core has a second tapered width in the coupling region, and the second tapered width is greater than the first tapered width over the coupling region.

18. The structure of claim 14 further comprising:
    a power supply; and
    a heater coupled to the power supply, the heater positioned in proximity to the third waveguide core, and the heater configured to selectively transfer heat to the third waveguide core for providing the selective temperature change.

19. The structure of claim 14 wherein the active material is a phase change material.

20. A method of forming a structure for a polarization splitter, the method comprising:
  forming a first waveguide core and a second waveguide core that is adjacent to the first waveguide core in a coupling region; and
  forming a third waveguide core over the second waveguide core in the coupling region,
  wherein the third waveguide core is comprised of an active material having a variable refractive index,
  wherein the variable refractive index of the active material is configured to be varied by selective temperature change between a first refractive index and a second refractive index that is greater than the first refractive index.

* * * * *